(12) United States Patent
Erthle et al.

(10) Patent No.: US 12,379,028 B2
(45) Date of Patent: Aug. 5, 2025

(54) GASKET AND METHOD FOR PRODUCING A GASKET

(71) Applicant: Reinz-Dichtungs-GmbH, Neu-Ulm (DE)

(72) Inventors: Steffen Erthle, Neu-Ulm (DE); Johann Waldvogel, Neu-Ulm (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 53 days.

(21) Appl. No.: 18/327,790

(22) Filed: Jun. 1, 2023

(65) Prior Publication Data

US 2023/0392689 A1 Dec. 7, 2023

(30) Foreign Application Priority Data

Jun. 2, 2022 (DE) .................. 20 2022 103 142.8

(51) Int. Cl.
*F16J 15/06* (2006.01)
*F16J 15/12* (2006.01)

(52) U.S. Cl.
CPC ........... *F16J 15/061* (2013.01); *F16J 15/067* (2013.01); *F16J 15/128* (2013.01)

(58) Field of Classification Search
CPC ......... F16J 15/061; F16J 15/067; F16J 15/128
See application file for complete search history.

(56) References Cited

U.S. PATENT DOCUMENTS

| | | | | |
|---|---|---|---|---|
| 3,863,936 A * | 2/1975 | Farnam | ................. | F16J 15/123 277/592 |
| 4,272,085 A * | 6/1981 | Fujikawa | ............... | F16J 15/123 277/599 |
| 4,535,999 A * | 8/1985 | Locacius | ................. | F16J 15/123 277/637 |
| 4,973,067 A * | 11/1990 | Fritz | ........................ | B61D 7/22 277/645 |
| 5,149,109 A * | 9/1992 | Jelinek | .................. | F16J 15/127 403/381 |
| 5,611,549 A * | 3/1997 | Forry | ..................... | F16J 15/104 277/650 |
| 6,460,859 B1* | 10/2002 | Hammi | .................. | F16J 15/127 277/649 |
| 2011/0031704 A1* | 2/2011 | Lehr | ....................... | F16J 15/061 277/630 |
| 2014/0319782 A1* | 10/2014 | Mohammad | ............. | F16J 15/14 277/637 |

* cited by examiner

*Primary Examiner* — Vishal A Patel
(74) *Attorney, Agent, or Firm* — McCoy Russell LLP

(57) ABSTRACT

Gaskets and methods for manufacturing a gasket for sealing a gap in a housing, such as a battery housing, which gap extends at least partially around an interior of the housing, said gasket comprising at least one sealing layer. The sealing layer comprises at least two segments which are arranged adjacent to each other in the longitudinal direction of the sealing layer and are joined to each other at a joining region. The two segments have, at the joining region, intermeshing engagement elements joined to each other, and one or both of the segments has/have, at the joining region a positioning hole and a through-opening which are arranged behind the engagement element from the point of view of the respective other segment.

14 Claims, 13 Drawing Sheets

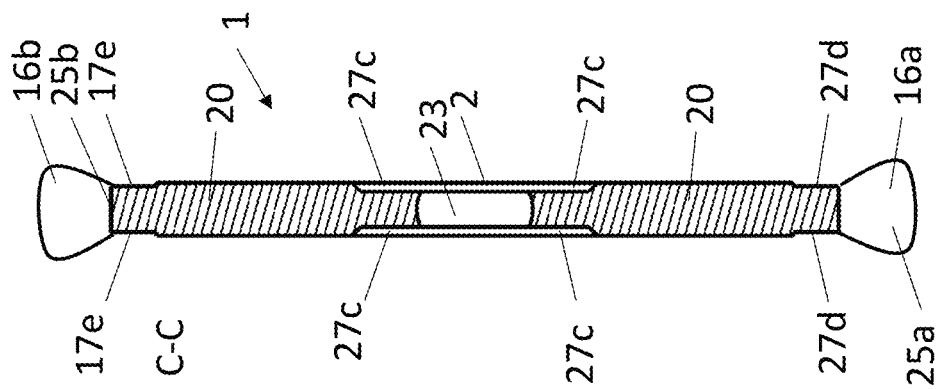
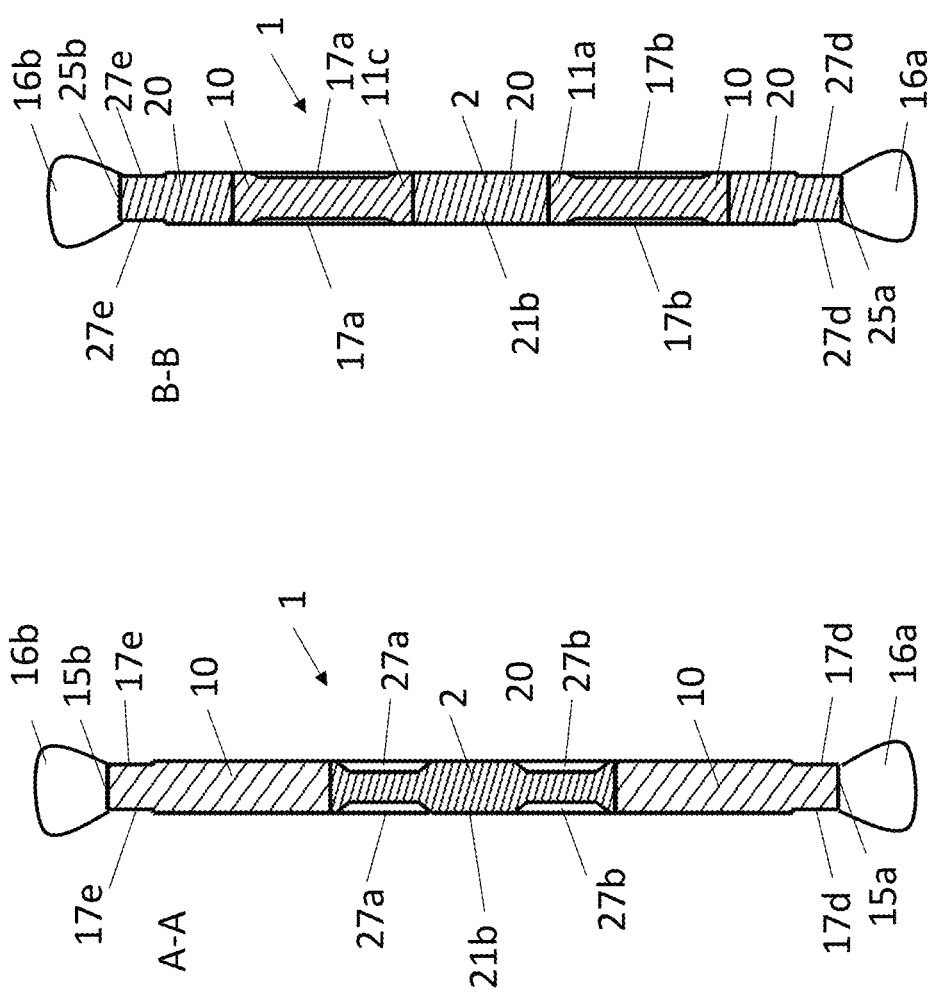
Fig. 5
Fig. 4
Fig. 3

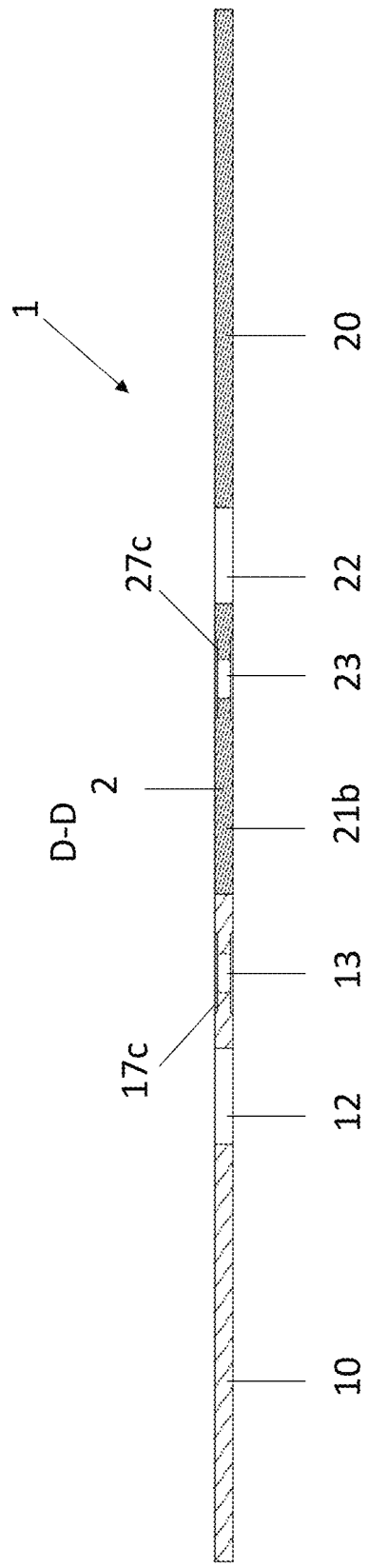

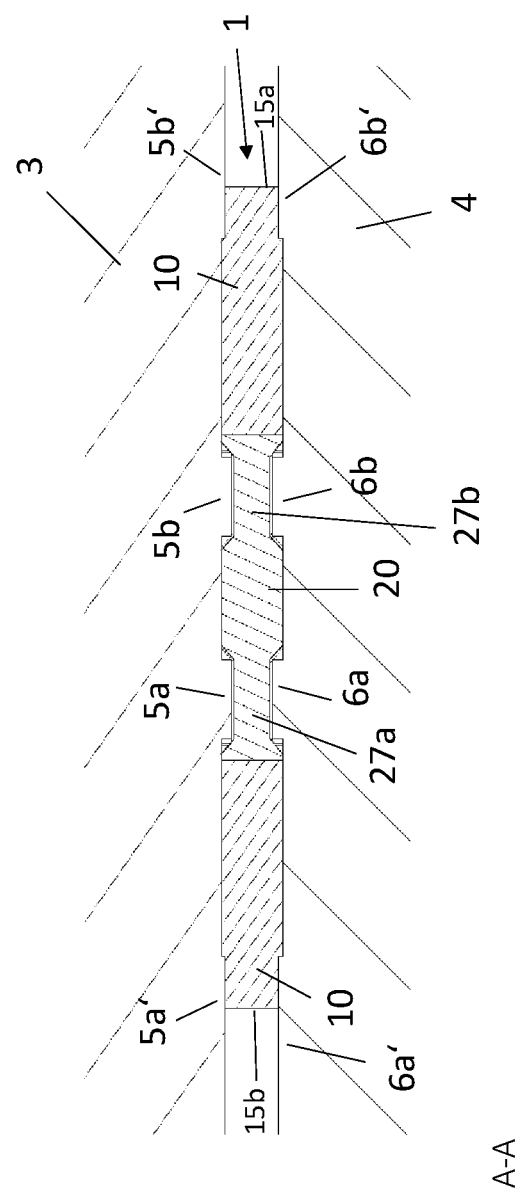

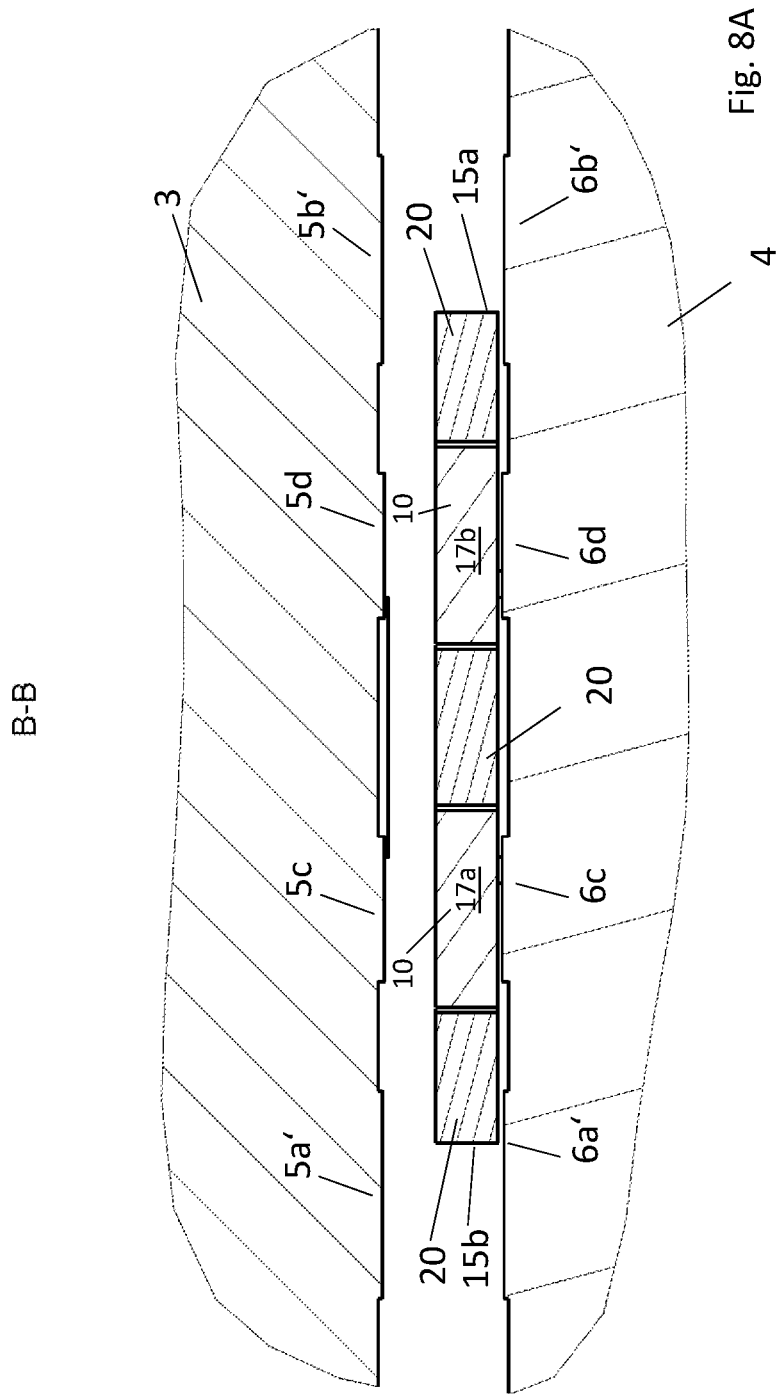

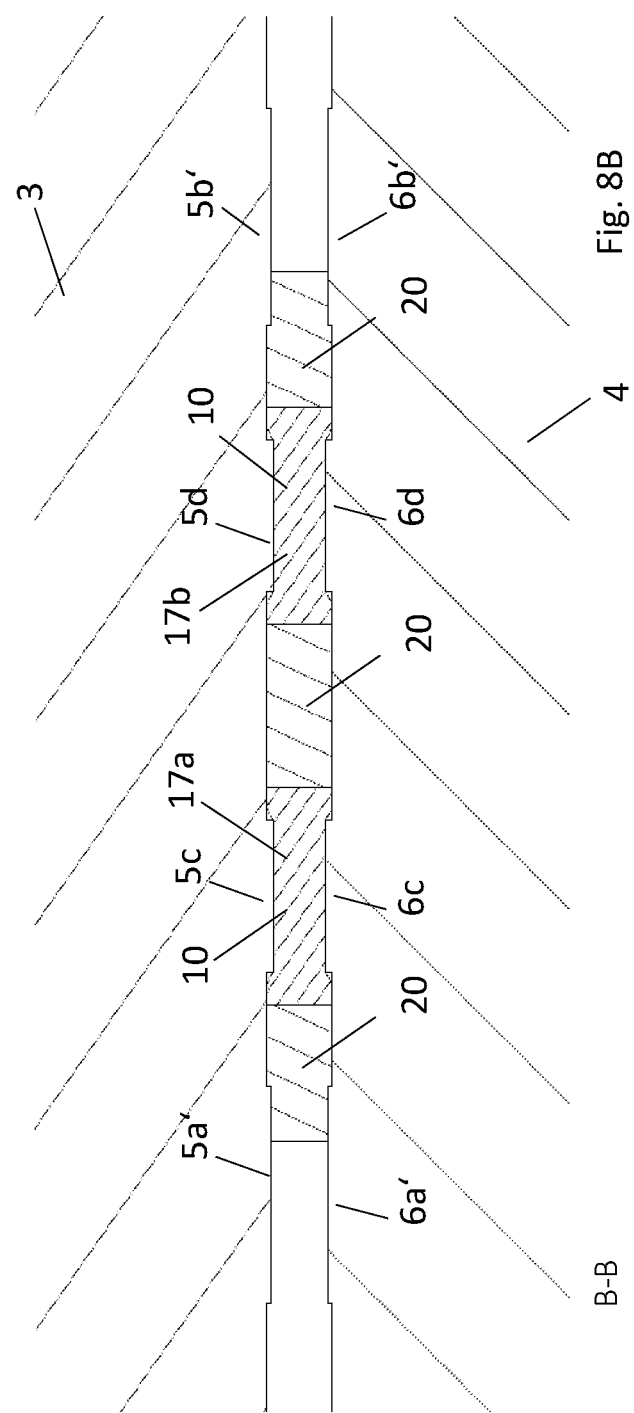

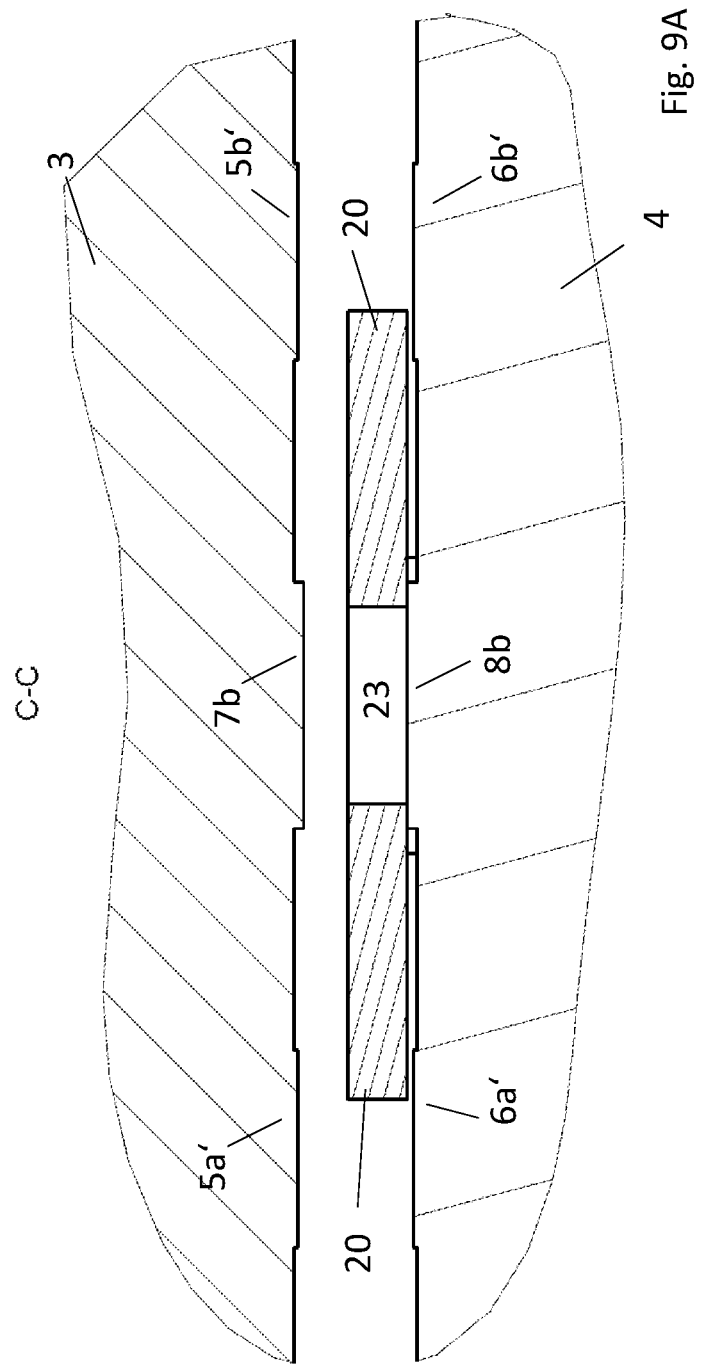

GASKET AND METHOD FOR PRODUCING A GASKET

CROSS-REFERENCE TO RELATED APPLICATION

The present application claims priority to German Utility Model Application No. 20 2022 103 142.8, entitled "GASKET AND METHOD FOR PRODUCING A GASKET", and filed on Jun. 2, 2022. The entire contents of the above-listed application is hereby incorporated by reference for all purposes.

TECHNICAL FIELD

The present disclosure relates to a gasket and to a method for producing a gasket, the gasket serving to at least partially seal a gap in a housing, which gap extends at least partially around an interior of the housing. Such a gap exists, for example, between a housing box and a housing cover. The present disclosure may relate to sealing the gap between an oil pan and the cylinder crankcase, or between a timing case cover and the engine, or between a battery case and the battery case cover.

BACKGROUND & SUMMARY

To seal the cover of a housing, use is usually made of frame gaskets which extend around the entire housing between the cover and the housing box. Such gaskets are often designed as rubber-metal gaskets, which comprise a metal carrier layer as a carrier frame with elastic sealing elements injection-molded thereon. When cutting such carrier frames of large rubber-metal gaskets, an enormous amount of die-cutting waste is generated as a result of the production process. To reduce the die-cutting waste, carriers of rubber-metal gaskets are therefore also produced in individual segments, which often are not assembled to form the frame of the carrier frame gasket until after additional steps have taken place, such as washing and coating the metal parts. The individual segments can thus be die-cut almost without waste, can easily be transported for further processing, and then can be assembled and joined together, typically by press-fit stemming.

In the case of rubber-metal gaskets, it is desirable for the metal carrier layers of adjacent individual segments to be press-fit stemmed already in the injection-molding die at the same time as the elastomeric sealing elements are injected, thus saving a die and a processing step. However, the press-fit stemming could also be carried out in a separate operating step. When press-fit stemming adjacent segments, however, significant warpage occurs in the respective metal carrier layers of the segments. If, for example, the carrier layers have positioning holes for fixing the rubber-metal gasket in a precise position in a die for one or more production steps or in a precise position on or in a housing, this warpage reduces the positional accuracy of the respective positioning hole in the carriers. Very high positional tolerances must therefore be provided. On the other hand, the individual segments are fixed in the correct position in the press-fit stemming or injection-molding die by means of positioning pins, which engage in corresponding positioning holes in the metal carrier layers of the individual segments. If the individual segments then warp during press-fit stemming, the positioning holes become jammed by the positioning pins and the finished frame gasket can only be removed from the press-fit stemming die with difficulty. This warpage may occur as a result of material being displaced when two segments are press-fit stemmed, and thus the dimensional accuracy of the respective segment is no longer ensured.

The present disclosure aims to provide a gasket in which no warpage or only very little warpage or very slight displacement of the segments occurs as a result of adjacent segments being joined, such as by press-fit stemming, and thus, also in the further gasket assembly process, no jamming between positioning pins and positioning holes occurs either in a die or in a housing, and the dimensional accuracy and thus also the function of the gasket is still ensured. Furthermore, the intention is for the joining region of the gasket according to the present disclosure to have a high retaining strength, a high moment of resistance against buckling, and small positional tolerances of the positioning holes in the metal carrier layer of the rubber-metal gasket. For example, the intention is for the gasket to be able to be produced in a single die, for example a press-fit stemming die, directly together with the injection molding of the elastomeric sealing elements onto the metal carrier layer segments in an injection-molding die. For the gasket according to the present disclosure, this requires that removal from the die is also easily possible, without the gasket becoming jammed in the die.

Furthermore, the present disclosure provides a production method for a gasket as described above that is simple, inexpensive, generates little die-cutting waste, and may easily be carried out in conventional tools.

The above problems are addressed by embodiments of gaskets described herein.

The present disclosure therefore relates to a gasket which serves to seal a gap in a housing, such as a battery housing, which gap extends at least partially around an interior of the housing. The gasket comprises at least one sealing layer, for example a metal sealing layer, which comprises of at least two segments. The segments are arranged adjacent to each other in their longitudinal direction and in the longitudinal direction of the sealing layer and are joined to each other at least at one joining region. In this way, it is possible to provide, from individual segments, a gasket that has a long length, for example even a closed frame gasket that extends around a box opening.

According to the present disclosure, the joining region is designed in such a way that the two segments have intermeshing engagement elements which are or can be joined to each other. The segments of such a gasket often exist individually for transport to subsequent production steps or during production and are only joined to each other in the course of the production process.

The segments additionally have positioning holes which, in each segment, in the joined state, are arranged behind the engagement element from the point of view of an adjacent segment.

Here and in the following, a positioning "behind an/the engagement element" may refer to the case in which a positioning hole, as seen from an adjacent segment, e.g. for instance as seen from the line of contact with an adjacent segment—and in this case from the axis of symmetry of the engagement elements—is not merely arranged in the sequence of the engagement element but in a geometrically straight line behind the engagement element.

According to the present disclosure, each segment additionally has, at the joining region, a through-opening which is also arranged behind the engagement element from the point of view of the adjacent segment. The through-opening may be arranged in front of the positioning hole, behind the positioning hole, or to the side of the positioning hole. However, it may be advantageous if the through-opening is arranged in front of the positioning hole, for example in front of the nearest positioning hole, e.g. between the engagement element and the positioning hole, for example the nearest positioned positioning hole.

If two segments are to be joined to each other at one point, by compression or press-fit stemming, the displaced material flows predominantly into the gaps at the joining region. If it is desired to hold the gasket frame in position during this, for example by using positioning holes in the gasket segments and positioning pins on the die that engage therein, the warpage of the segments that occurs relative to the stationary positioning pins causes the segments to become jammed by the positioning pins in their positioning holes.

In one variant, the present disclosure now makes it possible that, by pressing a holding punch in the stamping die onto the carrier layer of the adjacent segments at the location of the through-opening, such as onto the circumferential edge thereof, each two segments to be joined can be held in position on both sides of the joining region and thus no jamming of the segments by the die occurs. This applies even when just one of the adjacent segments is designed in the manner according to the present disclosure.

However, these holding punches could in turn cause material displacements and even more warpage. According to the present disclosure, therefore, a through-opening is provided in the segments as a sacrificial hole. The holding punches can then be placed onto this through-opening and grip, for example, the circumferential edge of the through-opening. The material displaced by the holding punch can then flow into the through-opening beneath the holding punch, while at the same time preventing the material that is displaced in the press-fit stemming joint region of a segment from causing warpage at the positioning hole.

Therefore, when two segments are joined to each other, for instance compressed together or press-fit stemmed together, at a joining region, the through-opening—which is arranged for example between the joining region and the positioning hole—in combination with the holding punch enables the two segments to be held in position during the compression or press-fit stemming, almost without any warpage. By fixing the segments by means of the holding punch at a through-opening, any warpage of the metal carrier layer that occurs in the region of the joining region as a result of press-fit stemming two adjacent segments has no effect on the dimensional accuracy and position of the positioning hole arranged behind the punch or on the dimensional accuracy of the gasket as a whole. As a result, there is no warpage of the position of the positioning hole and thus no jamming of a positioning pin in the positioning hole. The finished gasket can thus easily be removed from the die and then installed with dimensional accuracy, for example on the rim of a battery box.

Since the through-opening can receive material displaced by the holding punch, no significant warpage occurs at the positioning hole located behind the through-opening from the point of view of the adjacent segment, thereby ensuring the dimensional accuracy of the positioning hole in the respective segment. At the time of insertion into an injection-molding die, the positioning hole in the respective segment can therefore serve to position the segment correctly in relation to adjacent segments and in relation to the elastomer to be injected. Since the through-opening between the joining region and the positioning hole receives material that is displaced when a holding punch is pressed on and pressed in, the positioning hole remains in its position with little or no warpage, so that the finished gasket can then easily be removed from the die. This also makes it possible for the gasket to be positioned, without jamming, on a housing that may likewise be equipped with positioning pins.

To sum up, since the joining region is designed with a through-opening as a fixing point for the respective segment during production of the gasket, for example by means of a holding punch, and as a sacrificial hole for receiving material that is displaced by the holding punch, the displacement of the segments as a result of warpage during the press-fit stemming or compression of the segments can be significantly reduced, and thus the layer of the gasket can be prevented from being jammed by the positioning pins in a die, for example in an injection-molding die.

Overall, this results in a gasket that solves all of the problems mentioned above. For example, such a joint exhibits a small amount of warpage compared to the non-joined state and can therefore easily also be produced in an injection-molding die. The segments thus joined can nevertheless easily be removed from the injection-molding die as a whole gasket. Furthermore, the positions of the individual openings, for example the through-opening or the positioning holes in the segments, are ensured with high accuracy, so that installation in a housing can also take place without difficulty. Finally, the joints between individual adjacent segments are very stable and have a high retaining strength and also a high buckling strength.

Since the holes, for instance the positioning holes, are present in the gasket with high positional accuracy, there is no need for additional measures as in conventional systems, such as, for example, providing a flexibility of the positioning pins. As a result, the dies required and also the production process are simpler and less expensive.

The engagement elements of adjacent segments may be formed of complementary protrusions or recesses on the outer edges of the two segments that extend between adjacent segments. For example, recesses and protrusions in the layer plane of the gasket may engage behind each other, so that adjacent segments are fixed to each other with a form fit in the longitudinal direction of the segments and the gasket.

The engagement elements may form dovetail-type joints, which may have a shape as known from jigsaw pieces, for example.

The press-fit stemming of the engagement elements of adjacent segments at the joining region may take place transversely to the longitudinal direction of the segments and the gasket, adjacently to each other or with an offset in the longitudinal direction of the segments. This offset of the centroids of the press-fit stemming elements in the longitudinal direction of adjacent press-fit stemming points may be approx. 1 mm or more. In addition, by virtue of such an offset, the warpage transverse to the longitudinal direction is smaller than when the positions at which the engagement elements are compressed are arranged directly adjacent to each other in the transverse direction.

Furthermore, the outer edge, e.g. the longitudinal edge of the segments, may be stamped when joining two segments. This prevents elastomer from reaching the carrier layer during the injection process.

The present disclosure also relates to a method for producing a gasket as described above, in which the two segments are compressed together, for instance press-fit stemmed together, in the region of the joining region.

Furthermore, the regions around the through-openings can be fixed from both sides of the sealing layer, such as by stamping, for instance along the circumferential edge of the through-opening.

Furthermore, the segments may be placed into an injection-molding die, and the two segments may be press-fit stemmed together by means of the injection-molding die, and an elastomer may be injected onto at least parts of the edge regions of the gasket.

This production method for a gasket as described above is simple, inexpensive, generates little die-cutting waste, and may easily be carried out in conventional dies.

Examples of gaskets according to the present disclosure will be given below. In all the figures, identical or similar elements will be provided with identical or similar reference signs, and therefore there may be no need to repeat the description thereof. A large number of optional features of the present disclosure are implemented in the following examples. However, it is also possible for the present disclosure to be developed with just one, with some, or with all of the optional features of the individual figures. It is also possible for optional features of different exemplary embodiments to be combined with each other.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 3 shows a first cross section of the gasket of FIG. 1, according to the present disclosure.

FIG. 4 shows a second cross section of the gasket of FIG. 1, according to the present disclosure.

FIG. 5 shows a third cross section of the gasket of FIG. 1, according to the present disclosure.

FIG. 6 shows a fourth cross section of the gasket of FIG. 1, according to the present disclosure.

FIG. 7B shows the first portion of FIG. 7A including the stamping die in a closed position, according to the present disclosure.

FIG. 8A shows a second portion of the gasket of FIG. 1 including the stamping die in an open position, according to the present disclosure.

FIG. 8B shows the second portion of FIG. 8A including the stamping die in a closed position, according to the present disclosure.

FIG. 9A shows a third portion of the gasket of FIG. 1 including the stamping die in an open position, according to the present disclosure.

DETAILED DESCRIPTION

Figure 1:
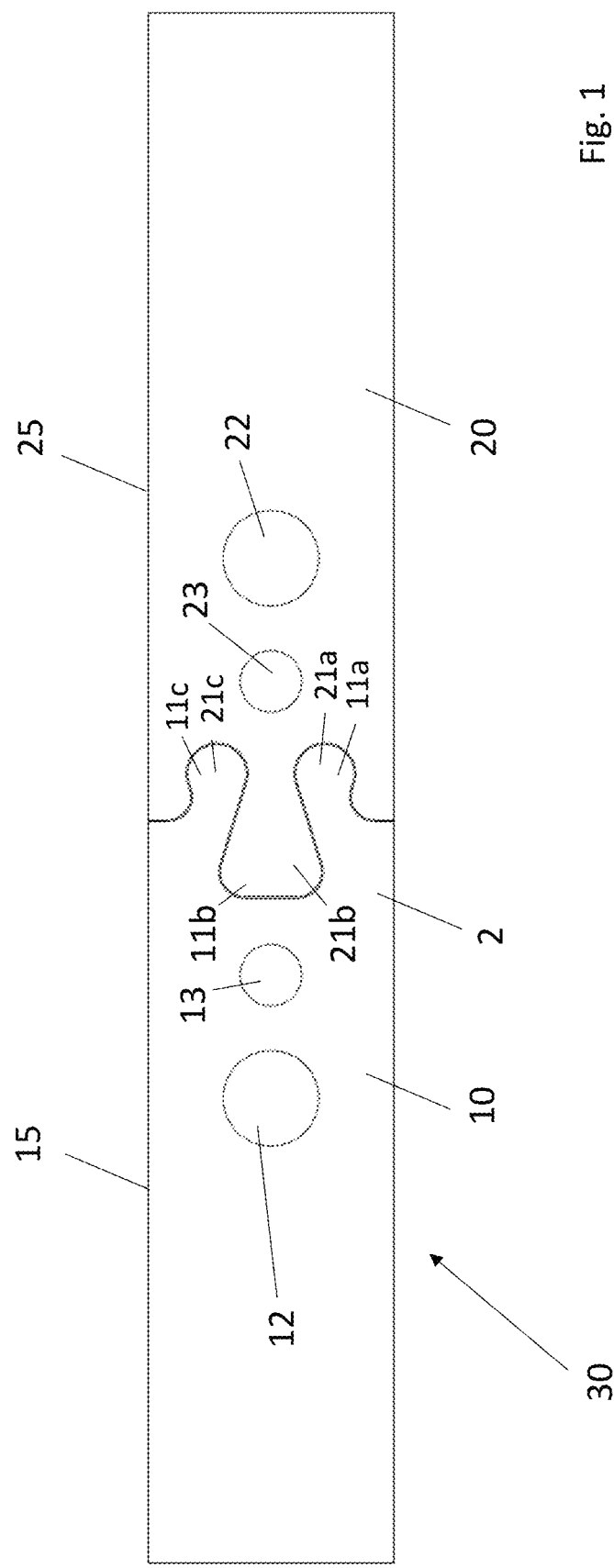
FIG. 1 shows a carrier layer of a gasket according to the present disclosure.

FIG. 1 shows a carrier layer 30 of a gasket 1 according to the present disclosure in plan view and in the region of two segments 10 and 20 which are joined to each other, but which have not yet been press-fit stemmed together. Each of these segments comprises substantially of a metal layer. The metal layers of the two segments 10 and 20 are joined to each other in a joining region 2. The first segment 10 has a positioning opening 12, a through-opening 13 and, adjacent thereto, engagement elements 11a, 11b and 11c which are arranged at the peripheral edge 15 of the segment 10 and adjacent to the segment 20. In a corresponding manner, the segment 20 has a positioning opening 22, a through-opening 23, and engagement elements 21a, 21b and 21c arranged at the peripheral edge 25 of the segment 20 and adjacent to the segment 10, the outer contour of these engagement elements being complementary to the outer contour of the engagement elements 11a, 11b and 11c. In this example, the engagement elements are designed either as dovetail-type protrusions (namely elements 11a, 11c and 21b) or as dovetail-type recesses (elements 11b, 21a, 21c).

When the segments 10 and 20 are joined to each other by the engagement elements, as shown in FIG. 1, the protrusion 11a engages in the recess 21a and forms an undercut between the segment 10 and the segment 20 in the layer plane of the segments 10 and 20. The protrusion 21b engages in the recess 11b and forms a corresponding undercut between the segment 10 and the segment 20. The protrusion 11c engages in the recess 21c and likewise forms a corresponding undercut between the segment 10 and the segment 20.

The through-opening 13 is arranged between the positioning opening 12 and the end of the segment 10 that is formed by the engagement elements 11a, 11b and 11c. In a manner symmetrical thereto, the through-opening 23 is arranged between the positioning hole 22 and the engagement elements 21a, 21b and 21c.

Figure 2:
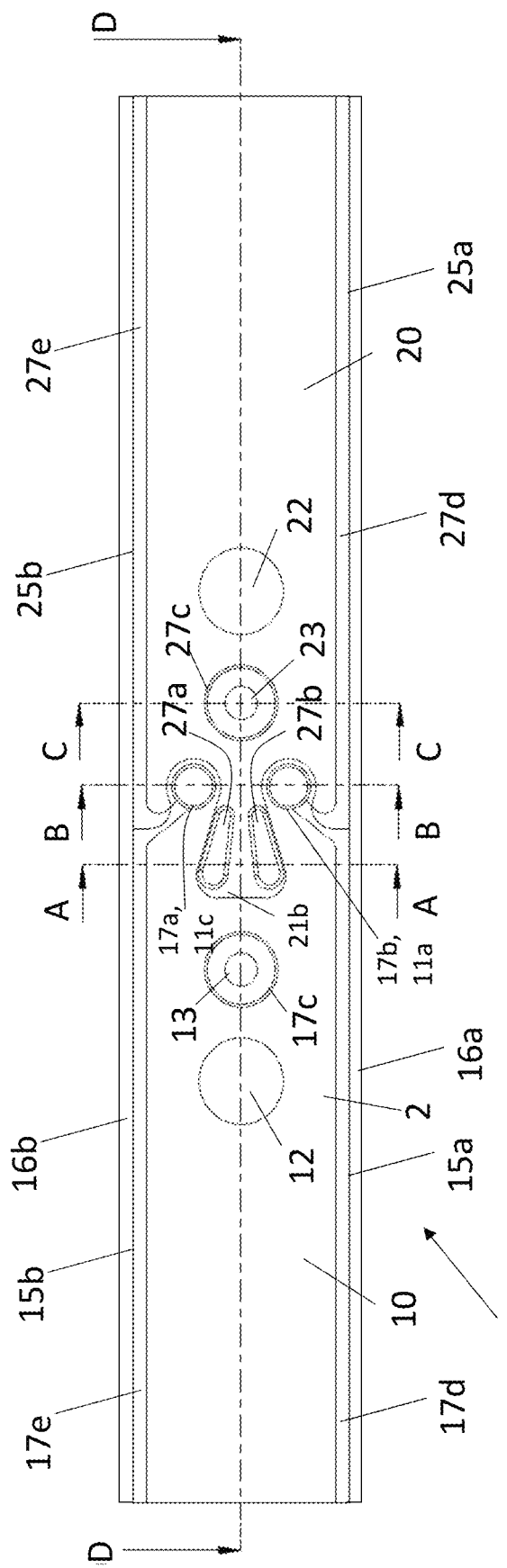
FIG. 2 shows the carrier layer of the gasket of FIG. 1 in a press-fit stemmed position, according to the present disclosure.

While FIG. 1 shows a carrier layer 30 in the region around a joining region 2 between two segments 10 and 20 in the non-press-fit stemmed state, FIG. 2 shows this gasket 1 according to the present disclosure in the same region in a state in which the two segments 10 and 20 are press-fit stemmed together and thus joined to each other in the joining region 2. In addition, the elastomer injections 16a and 16b are now located on the outer edge of the carrier layer 30; these extend over the two segments. The press-fit stemming of the two segments 10 and 20 takes place at compression points 17a, 17b, 27a and 27b, which are respectively arranged in the recesses 11c, 11a and 21b. The position of these press-fit stemming points is selected such that the two press-fit stemming points 27a and 27b are located next to each other transversely to the direction of extension of the gasket 1. The press-fit stemming points 17a and 17b are likewise located next to each other transversely to the direction of extension of the gasket 1, but are offset with respect to the press-fit stemming points 27a and 27b in the longitudinal direction of the gasket 1 and also transversely to the direction of extension of the gasket 1. This offset has the effect of minimizing the warpage of the joining region 2 that occurs as a result of material being displaced during the press-fit stemming of the points 17a, 17b, 27a and 27b. Nevertheless, the warpage of the segments 10 and 20 would still be considerable—such as at the positioning holes 12 and 22—and would lead to tilting or jamming of the positioning holes—if the through-opening 13 and the through-opening 23 were not arranged between these press-fit stemming points 17a, 17b, 27a, 27b, on the one hand, and the respectively adjacent positioning hole 12, 22, on the other hand, as per the present disclosure. When press-fit stemming the two segments 10 and 20 in a die, the segment 10 can now additionally be fixed, e.g. compacted, from both sides at the through-opening 13, e.g. at its peripheral edge, by means of holding punches which are placed onto the circumferential edge of the though-opening 13 from both sides of the segment 10 and fix the latter. In the same way, when press-fit stemming the two segments 10 and 20 in a die, the segment 20 can additionally be fixed from both sides at the through-opening 23 by means of holding punches which are placed onto the circumferential edge of the through-opening 23 from both sides of the segment 20 and fix the latter. Since the holding punches have to press against the gasket at the same time as the press-fit stemming punches, they penetrate deep into the carrier layer 30. As a result, however, the circumferential edge of the through-openings 13 and/or 23 is in turn compressed. This results in a form fit, which additionally holds the layer in position. However, the material that is compressed here can flow into the respective through-opening 13 or 23. The through-openings 13 and 23 thus serve as cutouts in the segments 10 and 20 for receiving material that is displaced by holding punches, e.g. as so-called "sacrificial holes". Thus, the present disclosure proposes a fixing of the gasket between engagement elements and positioning hole and a sacrificial hole for receiving the material displaced in the process.

The holding punches prevent significant warpage from occurring at the positioning holes 12 and 22 as a result of the joining region 2 being press-fit stemmed. The use of holding punches does not for its part produce any additional warpage, or only negligible warpage, at the positioning holes 12 and 22 since the holding punches press against the circumferential edge of the through-opening 13 and 23, but the through-openings 13 and 23 receive most or all of the material that is displaced by the holding punches.

The position of the positioning holes 12 and 22 is therefore not significantly affected, or is not affected at all, by the press-fit stemming of the two segments 10 and 20 at the joining region 2 and by the holding punches at the through-openings 13 and 23. The gasket 1 according to the present disclosure is therefore very dimensionally stable even in the joining region and in the region of the positioning holes 12 and 22 and is not jammed by positioning pins in the die or on a housing. It can therefore easily be removed from the die used for the joining process, and can also be applied with dimensional accuracy to a housing, for example a housing of a battery box.

In addition, the segment 10 is also compressed along its outer edge 15 having the edge sections 15a, 15b, so that depressions 17d, 17e are formed on the outer edge 15 in the layer of the segment 10. In a corresponding manner, the segment 20 is also compressed along its outer edge 25 having the edge sections 25a, 25b, so that depressions 27d and 27e are formed on the outer edge 25 in the layer of the segment 20. Elastomeric sealing lips 16a, 16b are injected onto these depressions.

The embossed contours produced during press-fit stemming of adjacent gasket segments, whether in the area of the joint, in the region of the sacrificial hole or along the outer edge of the segments, are easy to recognize because in these areas, on the one hand, the thickness of the metallic layer of the respective segment is reduced (see, for example, depressions 17d, 17e or recesses 17c, 27c) and, on the other hand, the microstructure of the metallic layer has been changed by the press-fit stemming process.

FIG. 3 shows a cross-section through the gasket 1 along the line A-A in FIG. 2. This cross-section extends transversely through the compression regions 27a and 27b in the protrusion 21b that serve to join the two segments 10 and 20, said compression regions being elongated in the longitudinal direction of the gasket 1.

FIG. 4 shows a cross-section along the line B-B in FIG. 2. This cross-section passes through the compression regions 17a, 17b in the protrusions 11a, 11c.

FIG. 5 shows a cross-section along the line C-C in FIG. 2. This cross-section passes through the through-opening 23. The edge of the through-opening 23 is likewise compressed here, resulting in depressions 27c. The material that is displaced in the regions 27c as a result of the compression can migrate into the through-opening 23 and therefore does not cause any warpage at the positioning hole 22. The fixing of the edge of the through-opening 23 also protects the positioning hole 22 against warpage caused by the press-fit stemming of the joining region 2.

FIG. 6 shows a cross-section along the line D-D in FIG. 2. This cross-section extends centrally through the gasket 1 in the longitudinal direction. The through-opening 13 in the segment 10 is compressed along its circumferential edge in the form of a circumferential depression 17c, and the through-opening 23 in the segment 20 is compressed along its circumferential edge in the form of the circumferential depression 27c. The material that is compressed out of the depressions 17c and 27c can flow into the respective through-opening 13 or 23. This prevents warpage from occurring at the positioning holes 12 and 22, or has the effect that any warpage that does occur there is minor and insignificant.

FIGS. 7A and 7B, 8A and 8B, 9A and 9B, and 10 show the gasket 1 according to FIGS. 1 and 2 in the sections A-A, B-B, C-C and D-D, respectively, in the state in which no press-fit stemming has yet taken place and the stamping die is still open, and in the state in which press-fit stemming has taken place and the stamping die is closed.

Figure 7A:
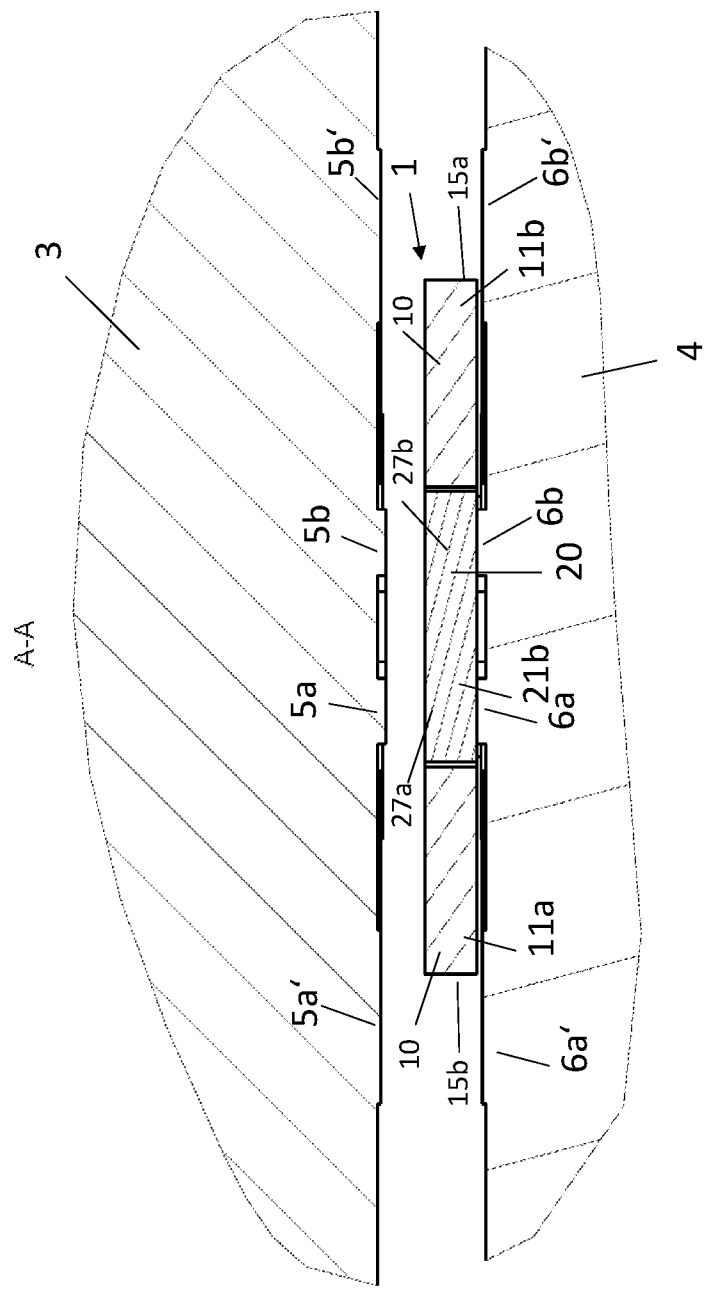
FIG. 7A shows a first portion of the gasket of FIG. 1 including a stamping die in an open position, according to the present disclosure.

FIG. 7A shows the section along the line A-A from FIG. 2 with a stamping die comprising of an upper stamping die plate 3 and a lower stamping die plate 4, wherein the stamping die is not yet closed and consequently the segments 10 and 20 are not yet joined to each other.

The upper stamping die plate 3 (in FIG. 7A) has stamping elements 5a and 5b, by which the second segment 20 can be compressed in compression regions 27a and 27b. The lower stamping die plate 4 (in FIG. 7A) also has corresponding stamping elements 6a and 6b, which during the stamping process are arranged opposite the stamping elements 5a and 5b, respectively, so that the compression regions 27a and 27b can be compressed between the elements 5a and 6a and between the elements 5b and 6b, respectively. By compressing the compression regions 27a and 27b, as shown with the stamping die closed in FIG. 7B, the second segment 20 is press-fit stemmed between the adjacent regions of the first segment 10.

Furthermore, the upper stamping die plate 3 has two stamping elements 5a' and 5b', and the lower stamping die plate 4 has the stamping elements 6a' and 6b' at corresponding positions. In the closed state of the stamping die, which is shown in FIG. 7B, the stamping elements 5a' and 6a' compress the edge region of the first segment 10 in order to flatten the outer peripheral edge 15b. An elastomer can then be injected in this region in the form of an elastomer seal (not shown here).

In a corresponding manner, the stamping elements 5b' and 6b' compress the opposite edge 15a of the first element 10 in order likewise to thin the first element 10 for the injection of an elastomer seal (not shown here).

FIG. 8A shows the section B-B from FIG. 2. In this section, the upper stamping die plate 3 has stamping elements 5c and 5d in addition to the stamping elements 5a' and 5b'. The lower stamping die plate 4 has stamping elements 6c and 6d in addition to the stamping elements 6a' and 6b'. By means of the stamping elements 5c and 6c and 5d and 6d, the first segment 10 can be compressed in the compression regions 17a, 17b and thus the first segment 10 can be press-fit stemmed to the adjacent second segment 20 in order to produce a stable form fit and friction fit between the segments 10 and 20. FIG. 8B shows the same section as in FIG. 8A, but with the stamping die comprising the stamping die plates 3 and 4 now closed.

Figure 9B:
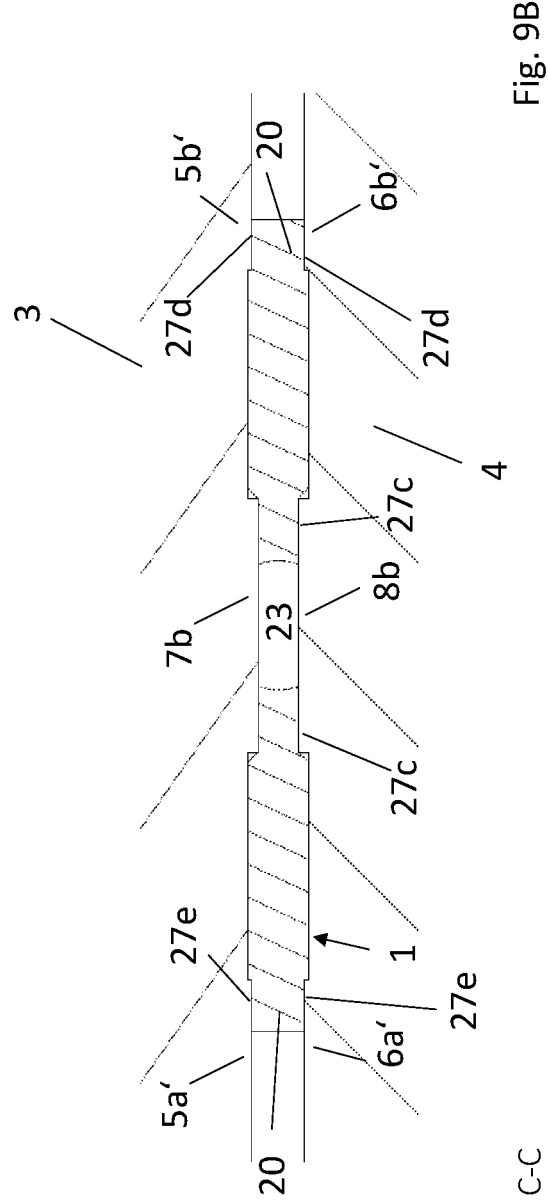
FIG. 9B shows the third portion of FIG. 9A including the stamping die in a closed position, according to the present disclosure.

FIGS. 9A and 9B show a section along the line C-C in FIG. 2. In addition to the stamping elements 5a', 5b', the upper stamping die plate 3 has a further stamping element 7b, by which the second segment 20 can be compressed in the region of the through-opening 23. In this section, the stamping die plate 4 likewise has the stamping elements 6a' and 6b' as well as a further stamping element 8b, by which, together with the aforementioned stamping element 7b of the stamping die plate 3, the circumferential edge of the through-opening 23 can be compressed.

FIG. 9A shows a state in which the stamping die is not closed, while FIG. 9B shows a state in which the stamping die is closed. As a result of the circumferential edge of the through-opening 23 being compressed by the stamping elements 7b and 8b, the second segment 20 is fixed at the through-opening 23 and prevents any warpage of the second segment 20 at this point as the joining region 2 is compressed in the regions 17a, 17b, 27a and 27b. The material that is displaced as a result of the compression of the segment 20 by the stamping elements 7b and 8b can migrate into the through-opening 23 as a sacrificial hole, thereby avoiding or at least considerably reducing any further warpage of the segment 20 caused by this compression.

Figure 10:
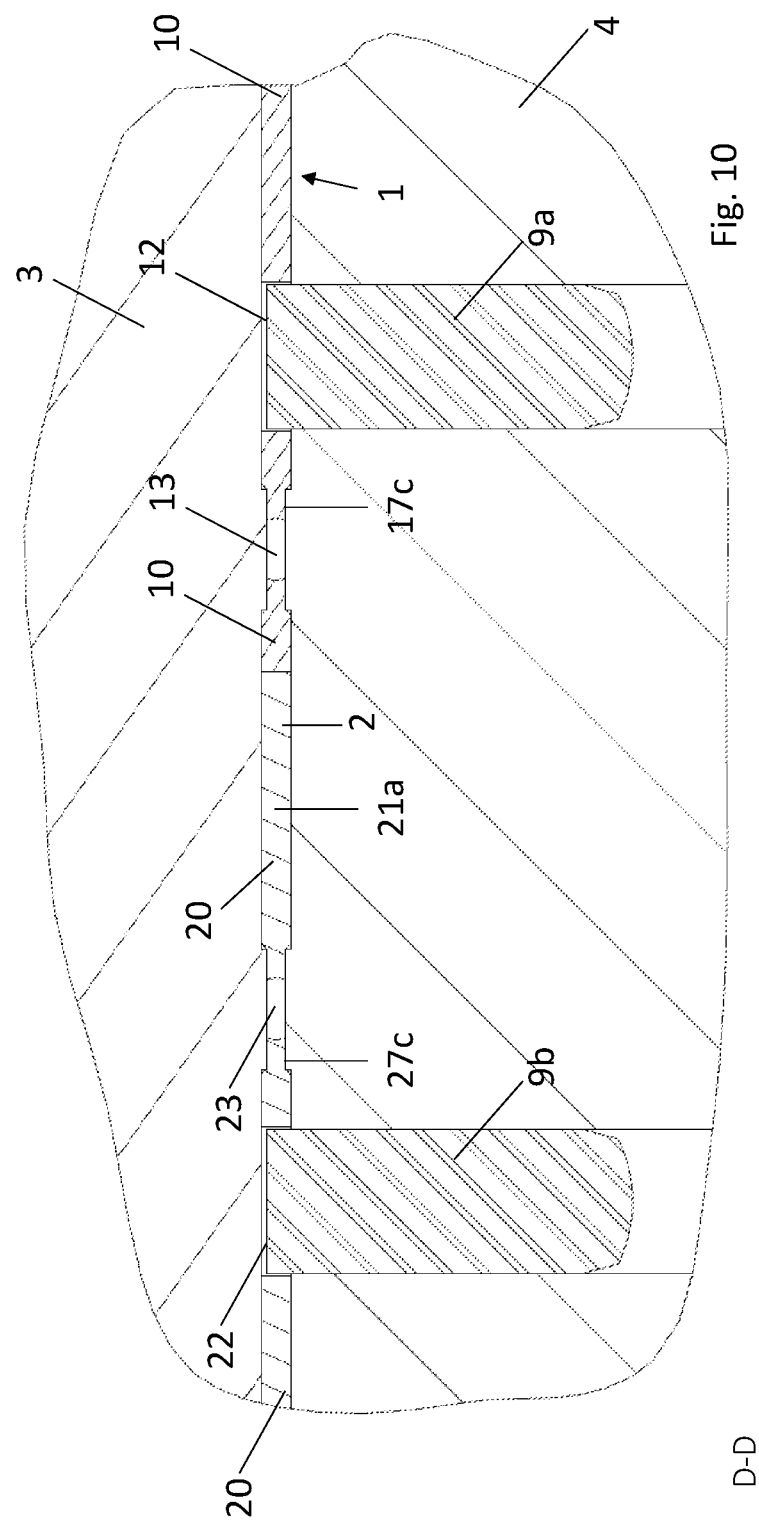
FIG. 10 shows a fourth portion of the gasket of FIG. 1 including the stamping die in a closed position, according to the present disclosure.

FIG. 10 shows a section along the line D-D in FIG. 2, in which the stamping die comprising the upper stamping die plate 3 and the lower stamping die plate 4 is closed, e.g. in the compressed state. Arranged in each of the positioning holes (fitting holes) 12 and 22 is a respective positioning pin 9a and 9b, by which the segments of the gasket 1 are held in position during the compression. These positioning holes can also subsequently be used to accurately position the gasket 1 at its intended location.

Since both the first segment 10 and the second segment 20 are simultaneously fixed at the through-openings 13 and 23 during the compression of the joining region 2, warpage caused by the stamping of the joining region 2 has no effect or only a minor effect on the regions around the through-openings 13 and 23 and for instance on the regions of the segments 10 and 20 that are located behind the through-openings 13 and 23 from the point of view of the respective other segment. This prevents any warpage of the positioning holes 22 and 12 and any jamming or tilting of the positioning pins 9b, 9a in the positioning holes 22 and 12.

In the present example, the positioning holes 12 and 22 are arranged in each case behind, such as in a straight line behind, the adjacent through-openings 13 and 23 from the point of view of the respective other segment, as seen from the joining region. However, it is also possible for them to be arranged to the side of or in front of the through-openings 13 and 23, without entirely losing the described technical effects.

Figure 11:
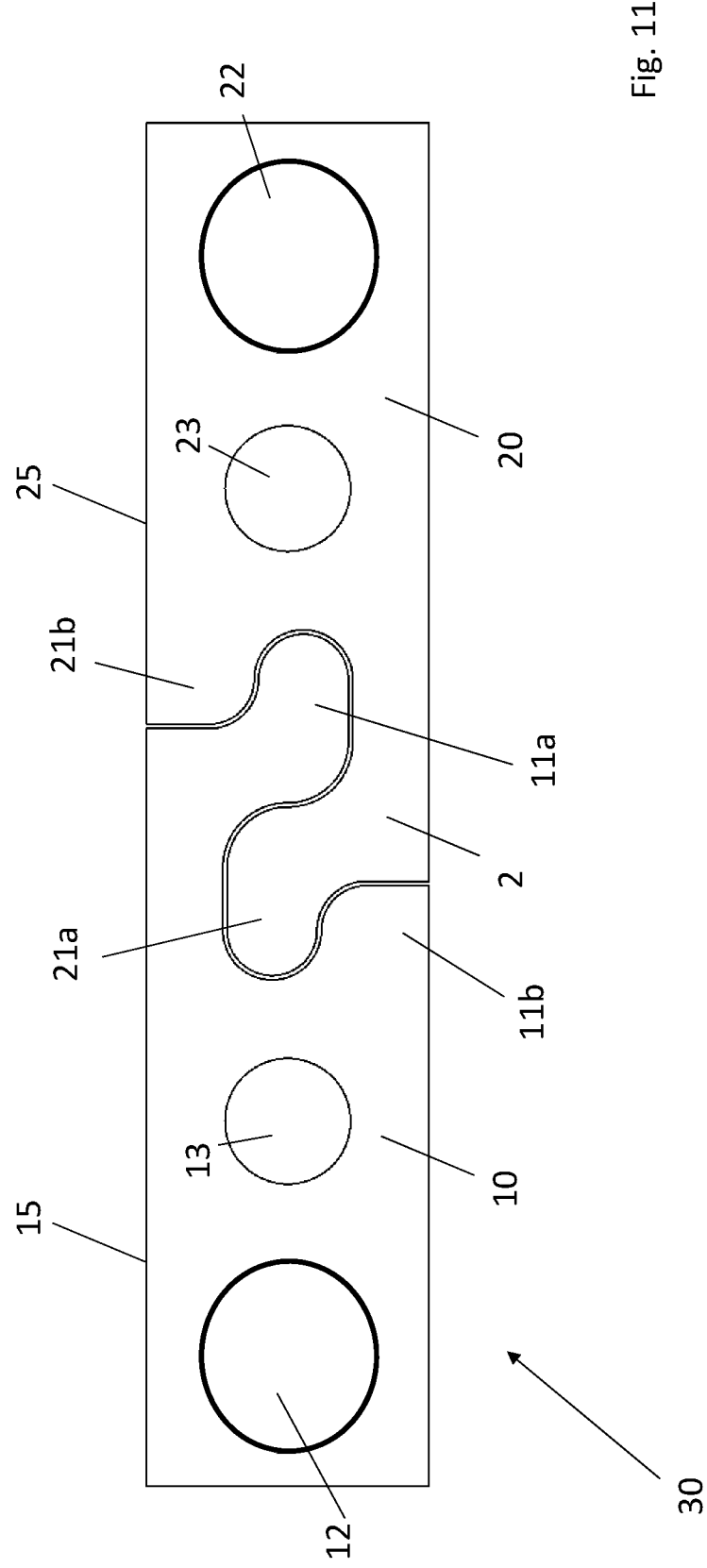
FIG. 11 shows a carrier layer of a gasket that includes two gasket sections, according to the present disclosure.

FIG. 11 shows the carrier layer of a gasket with two gasket segments 10 and 20, which are connected to each other in a joining region 2. FIG. 11 is an illustration of another example corresponding to the illustration in FIG. 1. The gasket segments 10 and 20 are constructed like the gasket segments 10 and 20 in FIG. 1 and differ from them in the shape of the engagement elements. While the engagement elements 11a, 11b, 21a, 21b, 21c, 11c in FIG. 1 are formed in a dove-tailed shape, the engagement elements 11a and 21a in FIG. 11 are formed in such a way that they engage laterally behind one another and produce a form fit in the direction of the longitudinal axis of the segments 10 and 20. For this purpose, the engagement elements are S-shaped, each of the engagement elements 11a and 21a extending longitudinally from their respective segment at one segment edge and having a projection at their end in the direction of the other edge, so that the two engagement elements 11a and 21a have an approximately S-shaped course, engage in the free spaces formed by the respective other engagement element and undercut one another.

Figure 12:
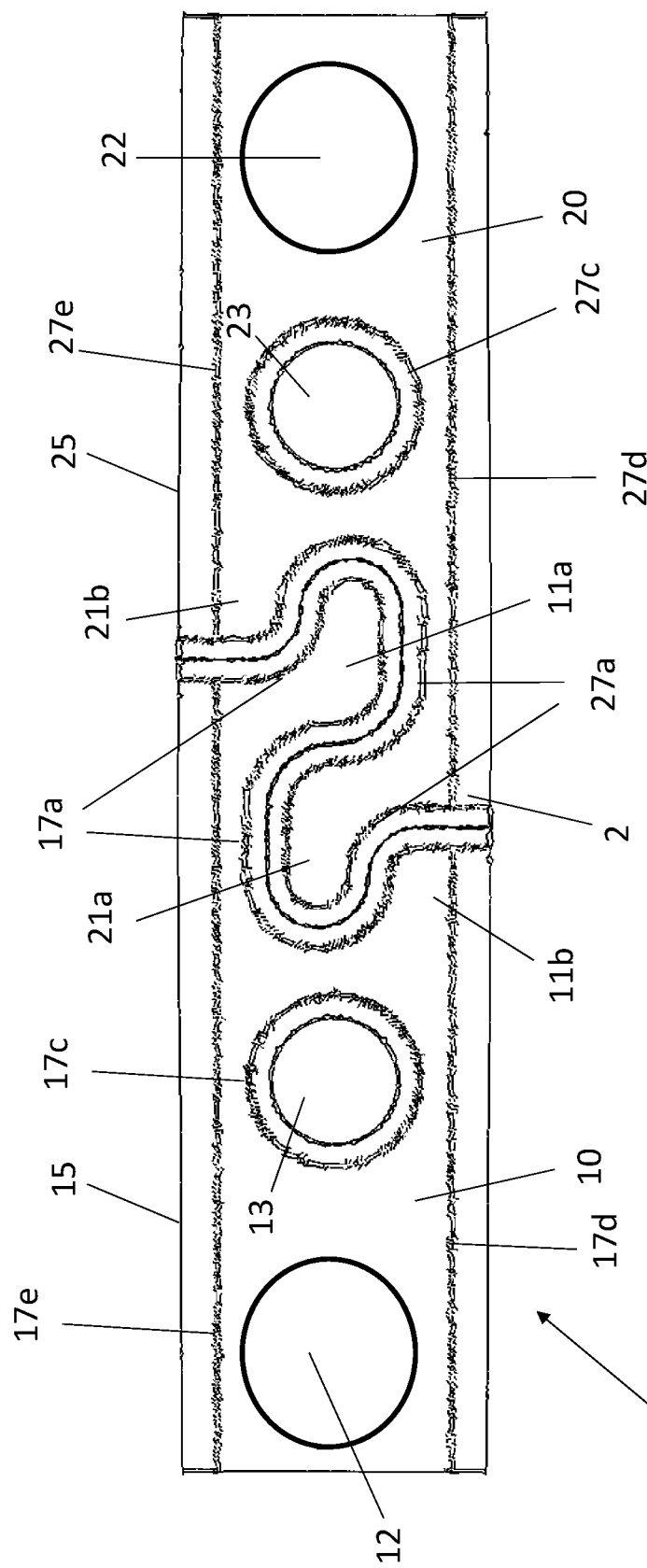
FIG. 12 shows the carrier layer of the gasket of FIG. 11 in a press-fit stemmed and stamped position, according to the present disclosure.

FIG. 12 shows the same carrier layer as in FIG. 11, but after press-fit stemming and stamping of the two segments 10 and 20 in the joint region 2 at the through-holes 13 and 23 and at the outer edge of the segments 10 and 20. The press-fit stemmed regions in which the layer thickness is reduced are designated by the reference signs 17a, 17c, 17d, 17e and 27a, 27c, 27d, 27e. In contrast to the illustration in FIG. 2, the embodiment of segments 10 and 20 in the joint region 2 are only press-fit stemmed together along the two adjacent outer edges of the engagement elements 11a, 11b and 21a, 21b.

FIGS. 1-12 are shown approximately to scale. FIGS. 1-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" or "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A press-fit stemmed metal gasket for sealing a gap extending at least partially around an interior of a housing, said press-fit stemmed metal gasket comprising at least one sealing layer,
    wherein the sealing layer comprises at least two segments which are arranged adjacent to each other in the longitudinal direction of the sealing layer and are joined to each other at a joining region,
    wherein the two segments have, at the joining region, intermeshing engagement elements joined to each other,
    wherein at least one segment of the two segments has, at the joining region, a positioning hole and a through-opening which are arranged behind the engagement element from the point of view of a respective other segment, wherein the through-opening is a fixing point for a stamping element, and wherein the sealing layer has a reduced thickness along a circumferential edge of the through-opening,
    wherein the segment comprises a first surface and a second surface, the second surface parallel to the first surface and positioned around the circumferential edge of the through-opening, the first surface connected to the second surface via a first contour or corner and a second, opposite contour or corner, and
    wherein the circumferential edge of the through-opening has a first diameter at the second surface and a second diameter at a center of a thickness of the segment, the second diameter greater than the first diameter.

2. The press-fit stemmed metal gasket according to claim 1, wherein the positioning hole is arranged in front of or behind the through-opening from the point of view of the adjacent segment.

3. The press-fit stemmed metal gasket according to claim 1, wherein the two segments are compressed together at the joining region.

4. The press-fit stemmed metal gasket according to claim 1, wherein an edge of one engagement element of one segment has a recess and an edge of another adjacent engagement element has a protrusion complementary to the recess.

5. The press-fit stemmed metal gasket according to claim 1, wherein the engagement elements form a dovetail-type joint.

6. The press-fit stemmed metal gasket according to claim 1, wherein a segment having a dovetail-type protrusion is compressed in a first compression region at a head end and/or at flanks of the dovetail-type protrusion, and/or a segment having a dovetail-type recess is compressed in second compression regions on both sides of a transition from the dovetail-type protrusion into a corresponding segment.

7. The press-fit stemmed metal gasket according to claim 1, wherein a centroid of the first compression region and centroids of the second compression regions are arranged at a distance of at least 1 mm from each other in the longitudinal direction of the press-fit stemmed metal gasket.

8. The press-fit stemmed metal gasket according to claim 1, wherein the reduced thickness along the circumferential edge of the through-opening contains material displaced from the segment.

9. The press-fit stemmed metal gasket according to claim 1, wherein the intermeshing engagement elements comprise a dovetail-type protrusion having a first thickness at an outer edge of the dovetail-type protrusion and a second thickness at an inner region, the second thickness smaller than the first thickness.

10. The press-fit stemmed metal gasket according to claim 1, wherein the through-opening and the axis of symmetry of the joining region are aligned along a midline of the press-fit stemmed metal gasket.

11. The press-fit stemmed metal gasket according to claim 1, wherein the segment further comprises a third surface opposite the first surface, and a fourth surface opposite the second surface, the fourth surface parallel to the third surface and positioned around the circumferential edge of the through-opening, the third surface connected to the fourth surface via a third contour and a fourth, opposite contour, and wherein the circumferential edge of the through-opening has the first diameter at the fourth surface.

12. A method of manufacturing a press-fit stemmed metal gasket according to claim 1, wherein the two segments are compressed together in the region of the joining region by compressing at least one segment with the stamping element.

13. The method according to claim 12, wherein the areas around the through-openings are fixed from at least one side along the circumferential edge of the through-opening.

14. The method according to claim 12, wherein the segments may be placed into an injection-molding die, and the two segments may be press-fit stemmed together by the injection-molding die, and an elastomer may be injected onto at least parts of the edge regions of the press-fit stemmed metal gasket.

* * * * *